United States Patent [19]

Bloomfield et al.

[11] 4,364,011

[45] Dec. 14, 1982

[54] MECHANICAL ASSEMBLIES EMPLOYING SENSING MEANS FOR SENSING MOTION OR POSITION

[75] Inventors: Edward J. Bloomfield, South Woodchester; Brian Snelgrove, Brockworth, both of England

[73] Assignee: Ransome Hoffmann Pollard Ltd., Chelmsford, England

[21] Appl. No.: 150,446

[22] Filed: May 16, 1980

[30] Foreign Application Priority Data

May 16, 1979 [GB] United Kingdom ................. 7916950

[51] Int. Cl.³ .............................................. G01P 3/48
[52] U.S. Cl. ..................................... 324/174; 324/165
[58] Field of Search ............... 324/174, 165, 168, 166, 324/173

[56] References Cited

U.S. PATENT DOCUMENTS

| | | | |
|---|---|---|---|
| 3,132,337 | 5/1964 | Martin | 324/174 X |
| 3,134,918 | 5/1964 | Eichenberger et al. | 324/174 X |
| 3,273,001 | 9/1966 | Baermann | 324/174 X |
| 3,728,565 | 4/1973 | O'Callaghan | 324/165 X |
| 4,142,152 | 2/1979 | Fincher | 324/165 |
| 4,259,637 | 3/1981 | Bloomfield et al. | 324/166 |

FOREIGN PATENT DOCUMENTS 2443631 3/1976 Fed. Rep. of Germany ...... 324/168

OTHER PUBLICATIONS

Lagergren et al., Integral Emitter & Handwheel, IBM Technical Disclosure Bulletin, Apr. 1971, p. 3339.
Jackson, Logical Motion & Direction Detection, IBM Technical Disclosure Bulletin, May 1972, pp. 3672 & 3673.
Crisp, Asynchronous Direction of Motion Detection, IBM Technical Disclosure Bulletin, Jun. 1972, pp. 114 & 115.
Crisp, Direction & Speed Detection Circuit, IBM Technical Disclosure Bulletin, Sep. 1972, pp. 1198& 1199.

*Primary Examiner*—Stanley T. Krawczewicz
*Attorney, Agent, or Firm*—Schwartz & Weinrieb

[57] ABSTRACT

Mechanical assemblies, particularly bearing assemblies, incorporate local sensing means for producing an electrical signal directly indicative of the movement of one part relative to another. The sensing means employs a toothed wheel or disc or a moulded magnetic plastics component which is designed to move, for example, rotate, with the one part and a sensor which is located to the other part. The sensor senses the motion of the toothed or moulded component and can utilize galvanomagnetic means, such as a Hall effect device, or a magnetoresistor, or a Wiegand effect device, to produce the aforesaid signal directly or after further processing.

15 Claims, 15 Drawing Figures

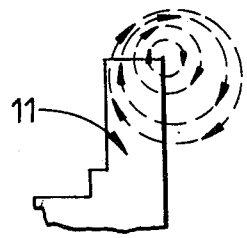
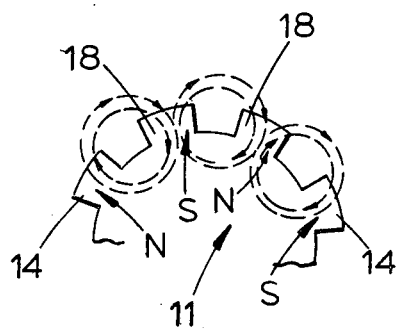
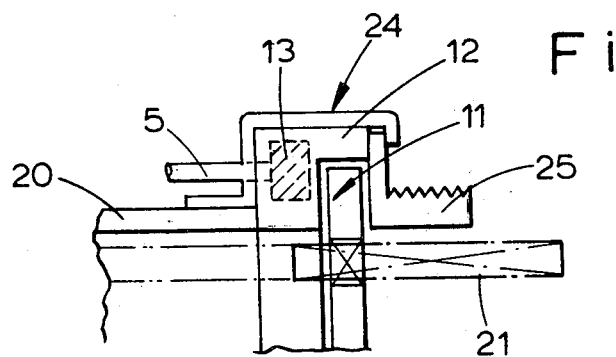
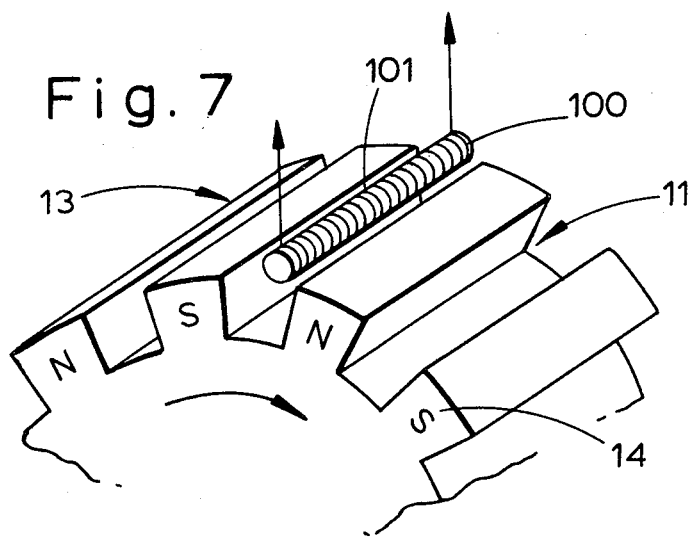

MECHANICAL ASSEMBLIES EMPLOYING SENSING MEANS FOR SENSING MOTION OR POSITION

FIELD OF THE INVENTION

The present invention relates in general to sensing means for sensing positional relationships or motion and to mechanical assemblies, particularly bearing assemblies, incorporating such sensing means.

BACKGROUND OF THE INVENTION

Various forms of sensing means and assemblies are described in U.S. patent application Ser. No. 925,671 of E. J. Bloomfield and F. S. Penman filed July 18th 1978, now U.S. Pat. No. 4,259,637, and assigned to the same assignee as the present application which is herein incorporated by reference.

OBJECTS OF THE INVENTION

The present invention seeks to provide further improvements in the assemblies and sensing means disclosed in U.S. Pat. No. 4,259,637.

SUMMARY OF THE INVENTION

In one aspect of the present invention, the toothed disc or the equivalent described in the aforementioned U.S. patent application Ser. No. 925,671 is replaced by a moulded plastics magnetic component provided with one or more magnetic poles during or after moulding and a sensor such as an inductive sensor, as described in the aforementioned U.S. patent application Ser. No. 925,671, provides a signal representing the speed or motion or position of this magnetic component or parts connected therewith.

In another aspect of the present invention, the toothed disc or equivalent described in the aforementioned U.S. Pat. No. 4,259,637 is used or is again replaced by a component provided with one or more magnetic poles (such as a moulded plastics magnetic component which is provided with such a pole or poles during or after moulding), and the sensor at least includes galvanomagnetic means or a Wiegand effect device. Preferred forms of the galvanomagnetic means are Hall effect detectors, and magnetoresistors. In this aspect of the invention, the sensor could take the form of a device incorporating the galvanomagnetic means or Wiegand effect device in conjunction with associated circuitry. This associated circuitry may be integrated with the sensing device per se, say as an available item, or otherwise combined with the sensing device, such as by an additional unit constructed from discrete components or as an integrated circuit chip or otherwise. The sensor device then detects the passage of the teeth or the magnetic pole or poles and provides a signal representing the speed or motion or position of the associated component or a part connected therewith. Where the galvanomagnetic sensor is used with a toothed disc, or its equivalent, one or more stationary magnets provide a magnetic field and a magnetic flux path is is established through the sensor. The magnetic flux path is then diverted periodically by the movement, for example, of the teeth, of the disc and the sensor develops a resultant signal.

The present invention thus provides sensing means and assemblies incorporating such sensing means modified in accordance with the foregoing statements.

According to a preferred embodiment of the present invention, a mechanical assembly comprises relatively movable parts, such as bearing races, with one part normally stationary carrying a sensor device, including a galvanomagnetic means or, Weigand effect device, which detects the passage of a magnetic pole or poles of a moulded plastics magnetic component or of the teeth of a toothed wheel moving with the other part. In a further aspect of the present invention, the assembly employs the aforementioned moulded plastics magnetic component provided with magnetic poles during or after moulding and at least two sensors or sensing devices which include galvanomagnetic means. The individual sensors or sensing devices then produce respective signals which are processed to provide a composite signal, at least indicating speed.

In another aspect, the assembly employs the aforementioned moulded plastics magnetic component provided with magnetic poles during or after moulding and two sensors or sensing devices which may be constructed as described in the U.S. Pat. No. 4,259,637 or may be as described hereinafter. These sensors or sensing devices are then physically positioned in relation to the poles of the magnetic component so as to provide phase-shifted or non-coincident signals which are processed to provide speed and direction indicative signals.

The invention may be understood more readil,y, and various other features and aspects of the invention may become apparent, from consideration of the following description.

BRIEF DESCRIPTION OF DRAWINGS

Embodiments of the invention will now be described, by way of examples only, with reference to the accompanying drawings, wherein:

FIG. 4 is a partial end view of the component of FIG. 3 depicting the magnetization thereof;

FIG. 5 is a partial front view of another moulded magnetic component depicting the magnetization thereof;

FIG. 6 is a schematic sectional side view of another assembly employing sensing means in accordance with the invention;

FIG. 7 depicts one form of sensing means usable in the assemblies;

DETAILED DESCRIPTION OF ILLUSTRATED EMBODIMENTS

Figure 1:
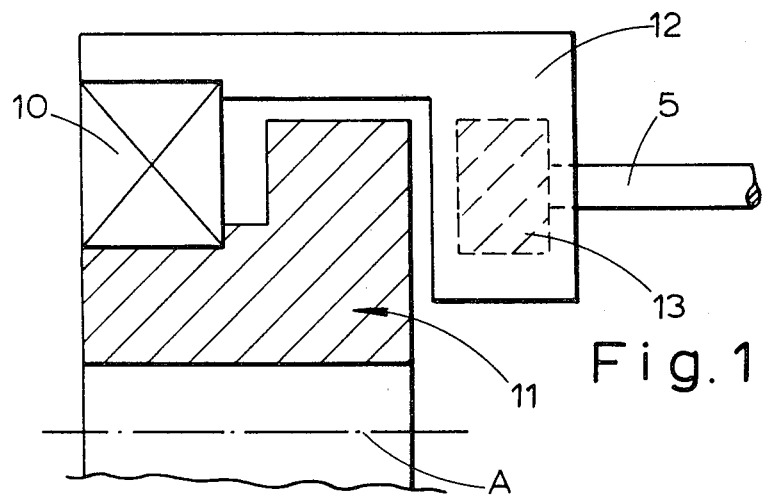
FIG. 1 is a schematic sectional side view of a bearing assembly employing sensing means in accordance with the invention.

As shown in FIG. 1, a conventional bearing assembly 10 is shown only schematically and is composed of inner and outer races with rolling elements, such as balls therebetween. A cage serves to locate and space the rolling elements and seals serve to screen off the interior of the bearing assembly, as is known. It is assumed for the purposes of this description that the outer race of the bearing assembly is stationary while the inner race rotates about axis A but, of course, this situation can be reversed. In this example, a moulded magnetic component 11 is fitted to the movable race—in this case the inner race—while a housing 12 is fitted to the outer race.

Figure 3:
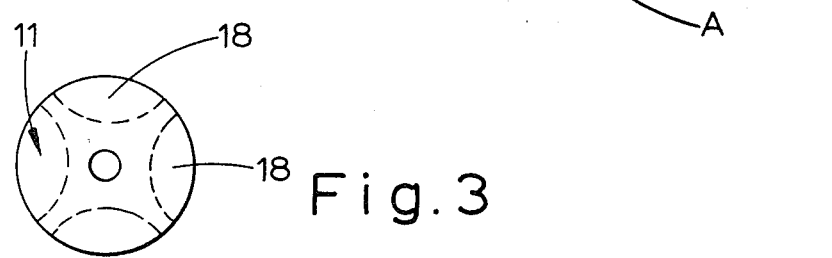
FIG. 3 is a front view of one form of moulded magnetic component for the sensing means.

The moulded magnetic component 11 is preferably fabricated from synthetic plastics with a magnetizable filler, such as is described in the article "Moulded Plastics Magnets" by Theberge, Arkels and Knabb in "Machine Design" 10 Feb. 1977. One suitable material for the component is Nylon 66 containing ferrite particles. The component 11 moulded to the desired shape can be selectively magnetized during or after the moulding process, FIGS. 3 and 4 depict one form of annular disc-like component magnetized to possess one or more, say four, magnetic poles 18 on its periphery. The component 11 can be magnetized by adopting applied magnetic fields, as shown in FIG. 4. Alternatively, the component 11 can take the form shown in FIG. 5 with projections or teeth 14 forming the magnetic poles 18 by adopting applied radial magnetic fields.

The housing 12 locates and supports a sensing means or sensor 13 which senses the movement of the component 11 to thereby generate a signal representing speed. A cable 5 leads to the sensor 13. The sensor 13 may take the form described in connection with FIGS. 3 and 4 of the drawings of the aforesaid U.S. Pat. No. 4,259,637. Alternatively, the sensor 13 can include galvanomagnetic means as now described. One form of device suitable as galvanomagnetic means for this application is a Siemens device, type SAS 250 or SAS 251. Such a device combines a Hall effect detector with associated circuitry which, when used in the manner illustrated in FIG. 1, provides a square wave output as the magnetic poles 18 of the component 11 move in the vicinity thereof. The Siemens device thus provides a number of pulses per unit time related to the speed of rotation of the component 11. Another form of device suitable as galvanomagnetic means is a magnetoresistor.

A further form of device suitable as sensing means for this application is a Wiegand wire. This device is a work hardened magnetic wire which operates in the manner known as the Wiegand effect. A Wiegand wire device is marketed by the Echlin Manufacturing Company of Branford, Conn. 66405 and is described in various publications—for example, Electronics Apr. 14th, 1977 and Design News Apr. 18th 1977. A Wiegand wire device is depicted simplistically in FIG. 7 where 100 denotes the Wiegand wire and 101 denotes a pick-up coil of fine wire wound around the Wiegand wire 100. As the magnetic component 11 moves in the vicinity of the Wiegand wire device 13 the magnetic poles 18 thereof cause pulses to be induced in the pick-up coil 101. These pulses can be processed, for example, shaped, or utilized directly in some applications.

Figure 2:
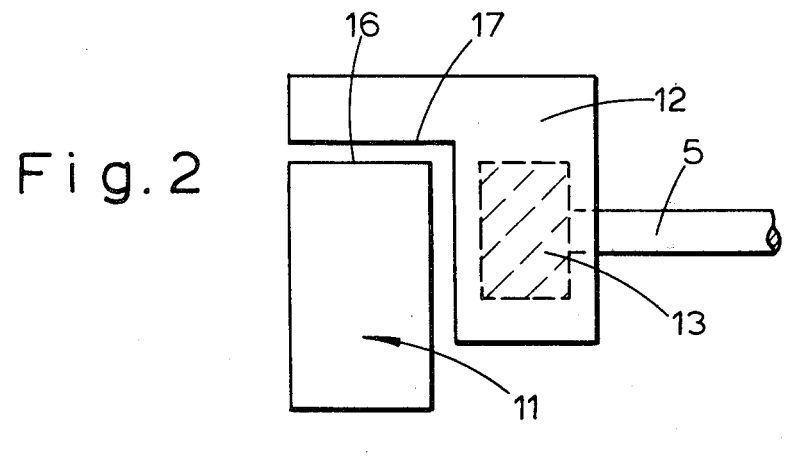
FIG. 2 is a schematic sectional side view of another bearing assembly employing sensing means in accordance with the invention.

FIG. 2 depicts a simplified plain bearing with the moulded plastics magnetic component 11 forming a peripheral bearing surface 16 engaged with or adjacent to a corresponding surface 17 of the housing 12, carrying the sensor 13.

FIG. 6 depicts an assembly adapted for use with a vehicle speedometer cable with an outer sleeve 20 and an inner rotating cable 21. The cable 21 has a square cross-section and passes through a similarly-shaped hole in the centre of the moulded plastics magnetic component 11, constructed as aforesaid. The sensor 13 (employing galvanomagnetic means or otherwise) is supported in the housing 12 as before and produces a signal signifying the speed of movement of the cable 21. The housing 12 is enclosed by a casing 24 fitted to the cable outer sleeve 20 and an adaptor 25 is clamped by the casing 24 and serves to receive a conventional threaded sleeve (not shown) surrounding the cable sleeve 20. In an alternative construction, a bearing, for example, as in FIG. 1, may be utilized in the assembly of FIG. 6 so that the cable 21 drives the inner race of the bearing 10 connected to the component 11. The assembly of FIG. 6 retaining the component 11 and sensor 13 may otherwise be modified to take the form illustrated in FIG. 15 of the drawings accompanying U.S. Pat. No. 4,259,637.

Figure 14:
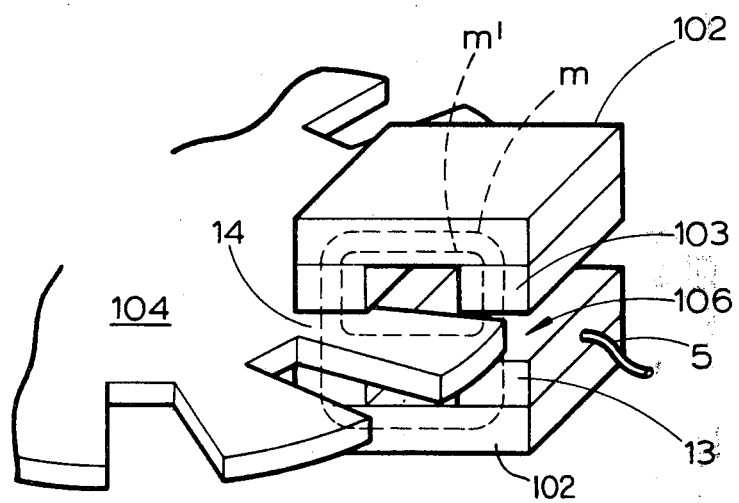
FIG. 14 depicts another form of sensing means in accordance with the invention.

FIG. 14 depicts a modified arrangement which utilizes galvanomagnetic means as the sensor 13, as previously described. In this arrangement, a magnet 103 and the sensor 13 are carried on supports 102 in a complementary spaced relationship to provide a magnetic flux path passing through the sensor 13 as depicted by the dotted line m. A rotatable toothed wheel 104, analogous to the component 11, is arranged so that its teeth 14 move in spaced succession through a gap 106 between the supports 102, the magnet 103 and the sensor 13. The wheel 104 has at least its teeth made from a suitable material to divert or shunt the flux path passing through the sensor 13 when one of its teeth 14 is present in the gap 106. The diverted flux path is depicted by the dotted line M'. As the toothed wheel 104 rotates, its teeth 14 periodically direct the flux path from m to m' and the spaces between the teeth conversely permit the flux path to revert from m' to m. The same effect can be achieved by any magnetic equivalent to the toothed wheel 104. In any event, the sensor 13, responds to provide a signal indicative of speed and is conveniently mounted with the supports 102 and the magnet 103 in a housing 12 as before.

Figure 8:
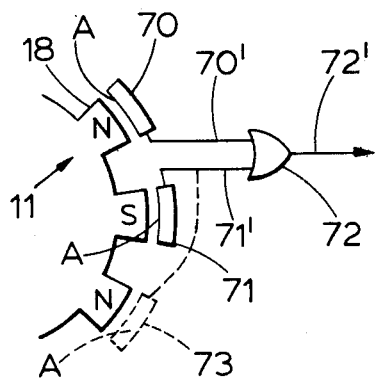
FIG. 8 is a schematic representation of another form of sensing means in accordance with the invention.
Figure 9:
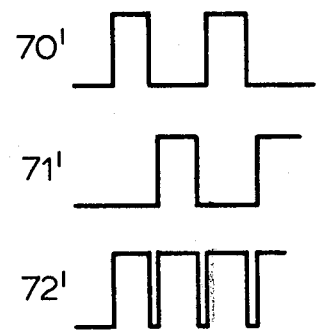
FIG. 9 depicts electrical waveforms pertaining to FIG. 8.

In general, a sensing device which incorporates galvanomagnetic means may respond inherently only to magnetic north or to magnetic south poles depending on the particular orientation adopted. FIG. 8 depicts sensing means which utilizes the magnetic component 11 and two sensing devices 70, 71, typically Siemens type SAS 250 or SAS 251 and which is adapted overall to detect the passage of all magnetic poles 18. Both the devices 70, 71 are arranged in an orientation with their faces A adjacent the poles 18 to sense magnetic north poles only. However, the device 71, for example, can be inverted, as depicted by chain-dotted lines 73, to sense south poles instead of north poles. It may also be possible to arrange both devices 70, 71 side-by-side or back-to-back with their faces A mutually reversed to achieve the same result. The outputs from the devices 70, 71 which are arranged to be non-coincident (waveforms 70', 71' in FIG. 9) are fed to the inputs of an OR gate 72 which then provides an output (waveform 72', FIG. 9) with the total number of pulses representing the passage of all the poles 18 and signifying speed.

Figure 10:
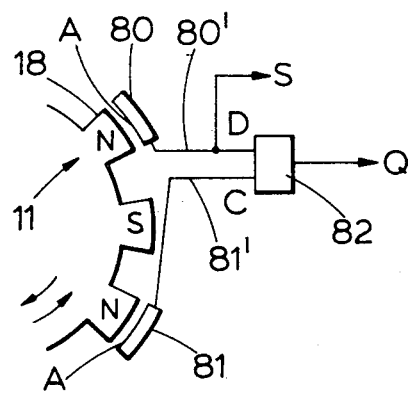
FIG. 10 is a schematical representation of a further form of sensing means in accordance with the invention.
Figure 11A:
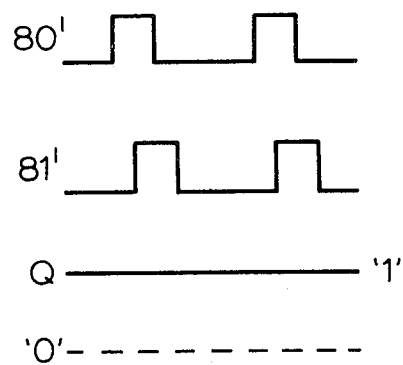
FIGS. 11a and 11b depict electrical waveforms pertaining to FIG. 10.
Figure 11B:
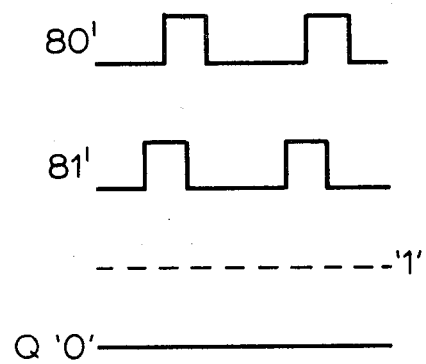

FIG. 10 depicts a further form of sensing means which provides both speed and direction indicative signals. As shown, the magnetic component 11 is again used in conjunction with two sensing devices 80, 81. These devices 80, 81 may incorporate galvanomagnetic means as described—such as the Siemens devices SAS 250 or SAS 251 or Wiegand wire devices—or, alternatively, the devices 80, 81 may take the form described in U.S. Pat. No. 4,259,637. The devices 80, 81 are physically arranged so that their respective output signals (waveforms 80', 81' FIG. 11) are displaced in time as the component 11 rotates. In this illustrated embodiment, the signal from the device 80 is taken as the speed indicative signal "S", while both signals are processed to determine the direction of rotation of the component 11. As illustrated, and by way of example, both signals from the devices 80, 81 are fed into a D type Flip-Flop 82 (at inputs D and C) providing an output Q sitting at logic '1' or logic '0' dependent on the rotational direction.

Figure 12:
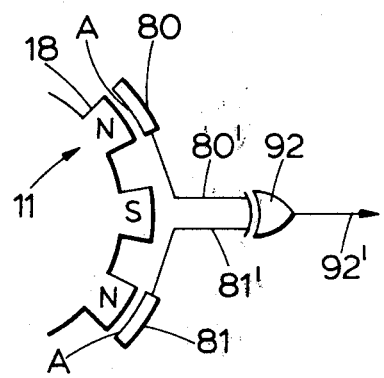
FIG. 12 is a schematical representation of a further form of sensing means in accordance with the invention.
Figure 13:
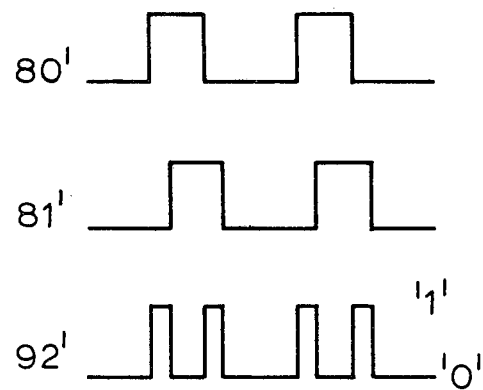
FIG. 13 depicts electrical waveforms pertaining to FIG. 12.

FIG. 12 depicts another sensing means similar to that of FIG. 10 where like reference numerals denote like parts. In contrast to FIG. 11 the signals 80', 81' from the sensing devices 80, 81 are fed into an exclusive OR gate 92 which provides an output 92' as illustrated in FIG. 13 generally equivalent to that obtained in the FIG. 8 arrangement. Depending on the physical characteristics and the mark-space ration of the signals 70', 71' the arrangement of FIG. 8 or FIG. 12 may be preferred.

Obviously, many modifications and variations of the present invention are possible in light of the above teachings. It is therefore to be understood that within the scope of the appended claims, the present invention may be practiced otherwise than as specifically described herein.

We claim:

1. A compact bearing assembly, comprising:
an inner bearing race;
an outer bearing race;
one of said inner and outer bearing races being rotatable about an axis while the other one of said inner and outer bearing races is stationary;
means incorporated within said one of said inner and outer bearing races, as an integral part thereof, for producing a signal means; and
means incorporated within said other one of said inner and outer bearing races, as an integral part thereof, for sensing said signal means, and therefore the movement of, said one of said inner and outer bearing races relative to said other one of said inner and outer bearing races.

2. The bearing assembly as set forth in claim 1, wherein:
said means incorporated within said one of said inner and outer bearing races is magnetic; and
said signal means is a magnetic flux field generated by said magnetic means.

3. The bearing assembly as set forth in claim 2, wherein:
said magnetic means comprises a moulded magnetic component.

4. The bearing assembly as set forth in claim 3, wherein:
said moulded magnetic component comprises a plastic material carrier having magnetic filler ferrite particles incorporated therein.

5. An assembly according to claim 3, wherein the moulded magnetic component is a plastics component provided with at least one magnetic pole during moulding.

6. An assembly according to claim 3, wherein the moulded magnetic component is a plastics component provided with at least one magnetic pole after moulding.

7. An assembly according to claim 3, wherein a plurality of separate sensing means are employed which are physically spaced in relation to the poles of the magnetic component to provide phase-shifted signals which are subsequently processed to produce speed and direction indicative signals.

8. An assembly according to claim 3, wherein a plurality of separate sensing means are employed which are physically spaced in relation to the poles of the magnetic component to provide phase-shifted signals which are subsequently combined to produce a composite signal at least indicating speed.

9. The bearing assembly as set forth in claim 2, wherein:
said sensing means is galvanomagnetic and produces a signal representative of the movement of said one of said inner and outer bearing races.

10. An assembly according to claim 9, wherein the galvanomagnetic means is a Hall effect device.

11. An assembly according to claim 9, wherein the galvanomagnetic means is a magnetoresistor.

12. The bearing assembly as set forth in claim 2, wherein:
said magnetic means comprises a toothed disc; and
said sensing means is galvanomagnetic;
whereby the magnetic flux path generated by said magnetic means and passing through said sensing means is modified by said teeth of said magnetic means so as to cause said sensing means to generate a signal representative of the movement of said one of said inner and outer bearing races.

13. The bearing assembly as set forth in claim 2, wherein:
said sensing means comprises a Wiegand effect device and produces a signal representative of the movement of said one of said inner and outer bearing races.

14. The bearing assembly as set forth in claim 13, wherein:
a plurality of separate sensing means are provided which are physically spaced about the axis of relative rotation so as to provide phase-shifted signals which are processed to produce speed and direction indicative signals.

15. The bearing assembly as set forth in claim 13, wherein:
a plurality of separate sensing means are provided which are physically spaced about the axis of relative rotation so as to provide phase-shifted signals which are combined to produce a composite signal at least indicative of speed.

* * * * *